United States Patent [19]

Olsson

[11] Patent Number: 4,737,057

[45] Date of Patent: Apr. 12, 1988

[54] LOCKING OR SECURING DEVICE FOR A ROTATABLE MACHINE ELEMENT, SUCH AS A BOLT OR A NUT

[75] Inventor: Rolf Olsson, Växjö, Sweden

[73] Assignee: Awapatent AB, Sweden

[21] Appl. No.: 941,552

[22] Filed: Dec. 11, 1986

Related U.S. Application Data

[63] Continuation of Ser. No. 784,717, Oct. 7, 1985, abandoned, which is a continuation of Ser. No. 448,586, Dec. 10, 1982, abandoned.

[30] Foreign Application Priority Data

Dec. 14, 1981 [SE] Sweden .................................. 8107472

[51] Int. Cl.⁴ .............................................. F16B 39/02
[52] U.S. Cl. ...................................... 411/92; 411/100; 411/123
[58] Field of Search ..................... 411/92, 91, 90, 93, 411/94, 95, 96, 97, 98, 99, 100, 116, 117, 118, 119, 120, 121, 122, 123, 124

[56] References Cited

U.S. PATENT DOCUMENTS

| | | | |
|---|---|---|---|
| 215,686 | 5/1879 | Smith | 411/97 |
| 247,487 | 9/1881 | Doray | 411/94 |
| 385,442 | 7/1888 | Burton | 411/97 |
| 1,019,680 | 3/1912 | McGavock | 411/92 X |
| 1,056,686 | 3/1913 | Jenkins | 411/91 |
| 1,427,566 | 8/1922 | Wear | 411/95 X |
| 1,741,077 | 12/1929 | Rusack | 411/91 |
| 2,423,918 | 7/1947 | Wohlhieter | 411/97 |
| 2,783,674 | 3/1957 | Becker | 411/521 X |
| 3,395,743 | 8/1968 | Black | 411/118 |

FOREIGN PATENT DOCUMENTS

| | | | |
|---|---|---|---|
| 384948 | 2/1965 | Switzerland | 411/116 |
| 230282 | 3/1925 | United Kingdom | 411/123 |
| 948177 | 6/1964 | United Kingdom | 411/122 |

Primary Examiner—Lloyd A. Gall
Attorney, Agent, or Firm—Pollock, Vande Sande & Priddy

[57] ABSTRACT

A locking device for fasteners such as hex nuts and bolt heads comprises plate-like body having an opening with centrally directed teeth which engage the nuts or heads when the device is pressed over them. A spring device or a bolted connector forces the locking device into a canted position in which it locks itself to the nut or head. By connecting pairs of such locking devices to each other, adjacent nuts or heads are prevented from rotating.

4 Claims, 5 Drawing Sheets ical field

LOCKING OR SECURING DEVICE FOR A ROTATABLE MACHINE ELEMENT, SUCH AS A BOLT OR A NUT

This is a continuation of co-pending application Ser. No. 784,717 filed on Oct. 7, 1985, now abandoned, which is a continuation of application Ser. No. 448,586 filed Dec. 10, 1982, now abandoned.

TECHNICAL FIELD

The present invention relates to a locking or securing device for a rotatable machine element having an edged, preferably a hexagonal portion, such as a bolt or a nut.

BACKGROUND ART

It is often necessary to lock or secure rotatable machine elements so that they are not unintentionally rotated or turned under the influence of vibrations or other movements to a position in which they do not fulfill their intended function. In the case of machine elements provided with edged portions, such as bolts and nuts, it is for this purpose previously known to use a locking or securing device comprising a locking or securing element in the form of a washer which is movable to a position, in which an opening formed in the locking or securing element receives the edged portion of the machine element under a firm engagement between the surfaces thereof and the portions of the locking or securing element defining the opening therein and which locking or securing element is adapted to be secured against turning at a point positioned at a distance from the opening.

However, the previously known locking or securing devices of this kind are either unsatisfactory with regard to their security or complicated with regard to construction and use and thereby unsatisfactory from the economical point of view.

DISCLOSURE OF THE INVENTION

The object of the present invention is to obviate these drawbacks and to provide a simple, easily mounted and reliable locking or securing device of the kind described above, which is especially well suited for the locking or securing of nuts and bolts of vehicle wheels.

In order to comply with this object the locking or securing device according to the invention is characterized in that the portions of the locking or securing element defining the opening thereof are adapted to be displaced into a firm engagement with the surfaces of the edged portion of the machine element while being deformed, when the edged portion is received in the opening of the locking or securing element. Further the locking or securing element is provided with a device for canting at least the portion of the locking or securing device in which the opening for receiving the edged portion of the machine element is formed in relation to a plane extending at right angles to the surfaces of the edged portion of the machine element after the edged portion of the machine element has been received in the opening of the locking or securing element.

Thereby, it is suitable that the portions of the locking or securing element defining the opening are constituted by teeth which are adapted to be deflected when the edged portion of the machine element is received in the opening of the locking or securing element.

In a preferred embodiment of the locking or securing device according to the invention the canting device is constituted by an element connected with the portion of the locking or securing element in which the opening for receiving the edged portion of the machine element is formed, this element being adapted to provide the canting of the portion of the locking or securing device by being pressed against a surface positioned beside the machine element.

BRIEF DESCRIPTION OF THE DRAWING

The invention is described in the following with reference to the accompanying drawings.

FIG. 2b is a side view of the locking or securing device shown in FIG. 2a.

FIG. 4b is a side view of the locking or securing device shown in FIG. 4a.

FIG. 5b is a side view of the locking or securing device shown in FIG. 5a.

FIG. 6b is a side view of the locking or securing device shown in FIG. 6a.

BEST MODE FOR CARRYING OUT THE INVENTION

Figure 1:
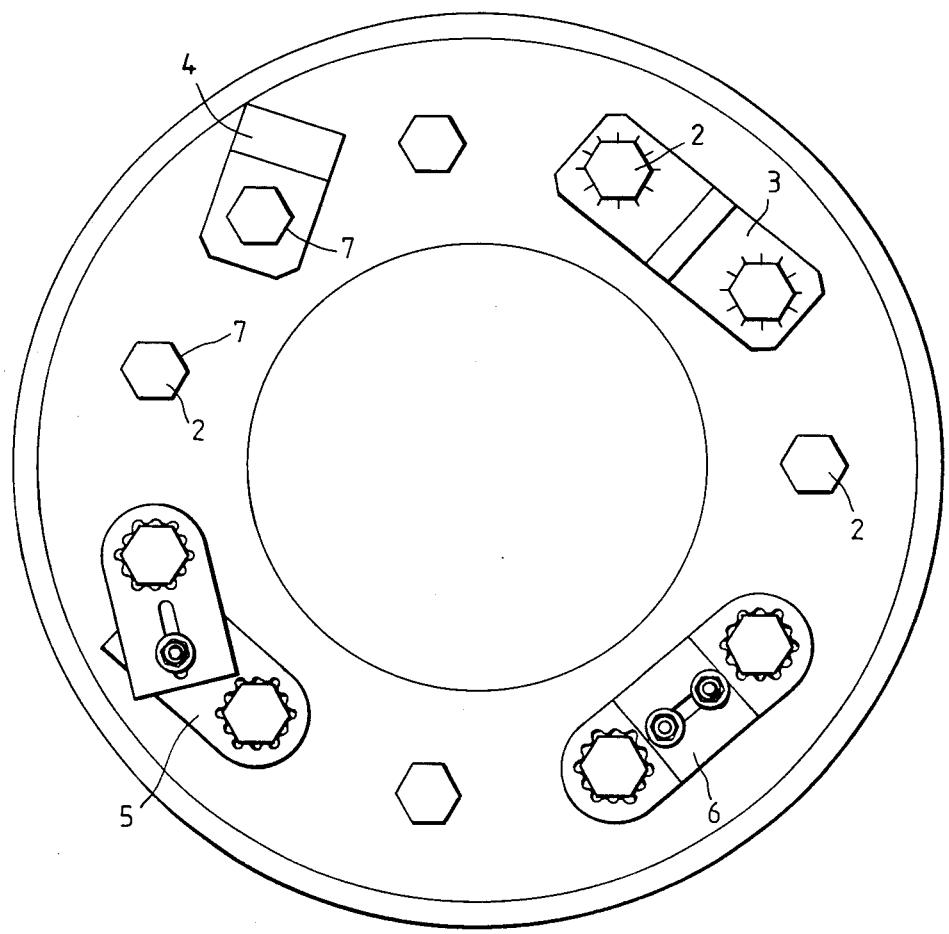
FIG. 1 shows a vehicle wheel having wheel nuts secured by means of different embodiments of locking or securing devices according to the invention.

In FIG. 1 there is shown the central part of a vehicle wheel 1 having ten hexagonal wheel nuts 2. According to FIG. 1 seven of the wheel nuts 2 are secured by means of locking or securing devices 3, 4, 5 and 6 according to different embodiments of the invention. The securing of the wheel nuts 2 is provided by having each wheel nut received in an opening in the locking or securing devices at a firm engagement between the portions of the locking and securing devices defining the openings therein and the outer surfaces 7 of the wheel nuts 2 and by the fact that the locking or securing devices are secured against rotation.

Figure 2A:
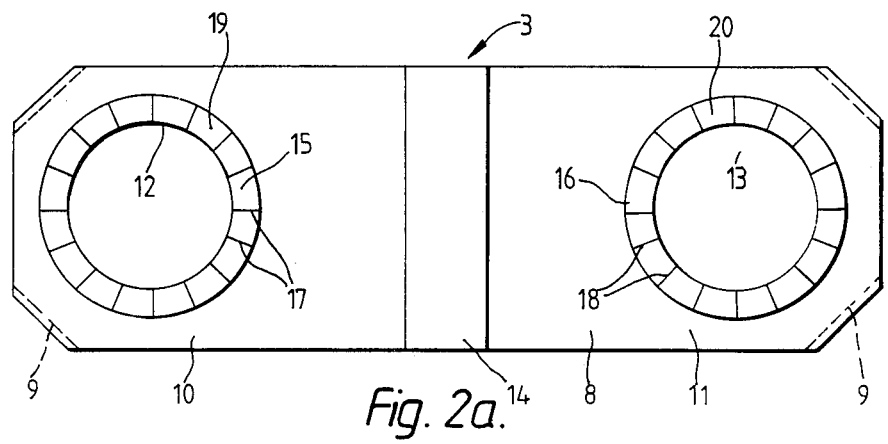
FIG. 2a is a plan view of one of the embodiments of the locking or securing devices according to the invention shown in FIG. 1.
Figure 2B:
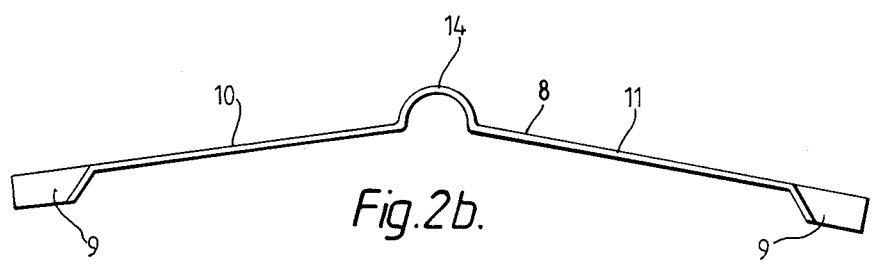

As appears from FIGS. 2a and 2b, the locking or securing device 3 is constituted by a substantially rectangular washer 8 which preferably is made of sheet metal. The four corners of the washer 8 are cut and bent as shown in FIG. 2b for constituting four downwardly directed projections 9. The projections 9 constitute spacing means for defining the distance of the washer 8 from the wheel 1. The washer 8 can be considered to comprise two locking or securing elements 10 and 11 connected with each other and each provided with an opening 12 and 13, respectively. The elements 10 and 11 are connected with each other by means of a bent connection portion 14 which in its unstressed condition retains the elements 10 and 11 in such a relative position that elements form an angle in relation to each other. The connection portion 14 is resilient so that the elements 10 and 11 can be elastically positioned in alignment with each other.

The portions 15 and 16 of the elements 10 and 11 defining the openings 12 and 13, respectively, are designed so as firmly to engage the wheel nuts 2 while being deformed when the locking or securing device is applied to the nuts. According to FIG. 2a the portions 15 and 16 are provided with slots 17 and 18, respectively, forming teeth 19 and 20, respectively, between themselves. It is, of course, possible to design the teeth in any desired way by providing slots 17 and 18 having desired width and shape.

Figure 3:
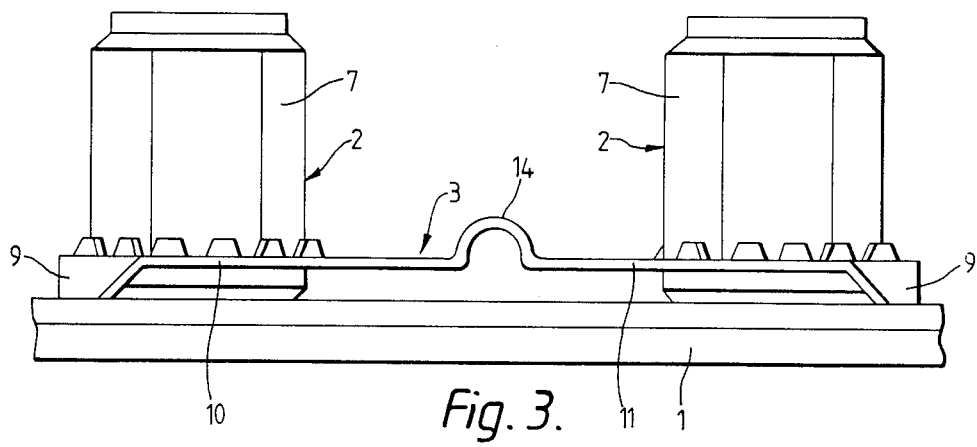
FIG. 3 is a side view of the locking or securing device according to FIGS. 2a and 2b in its position of use.

In FIG. 3 there is shown how the locking or securing device according to FIGS. 2a and 2b is applied to a pair of wheel nuts 2. The locking or securing device 3 is pressed onto the wheel nuts 2 while the elements 10 and 11 are in a position which is substantially perpendicular to the planes of the outer surfaces 7 of the nuts. Thereby, the teeth 19 and 20, respectively, are deformed by being deflected in the manner shown in FIG. 3, so that there is established a firm engagement between the teeth 19 and 20 on one side and the outer surfaces 7 of the nuts 2 on the other side. The locking or securing device 3 is displaced so far onto the nuts 2 that the projections 9 will engage the side surface of the vehicle wheel 1.

The appliance of the locking or securing device 3 on the wheel nuts is preferably conducted by means of a special tool (not shown). When the position according to FIG. 3 has been reached, the tool is removed, whereby the locking or securing device attempts to revert to the position shown in FIG. 2b, wherein the elements 10 and 11 form an angle in relation to each other. Thus, the elements 10 and 11 are striving to take a canted position in relation to a plane extending perpendicular to the outer surfaces 7 of the nuts 2. Thereby, there is provided a fastening of the elements 10 and 11 on the nuts 2 engaged thereby. The elements 10 and 11 secure each other with regard to rotation which provides that the elements 10 and 11 prevent an unintentional rotation of the nuts 2.

Figure 4A:
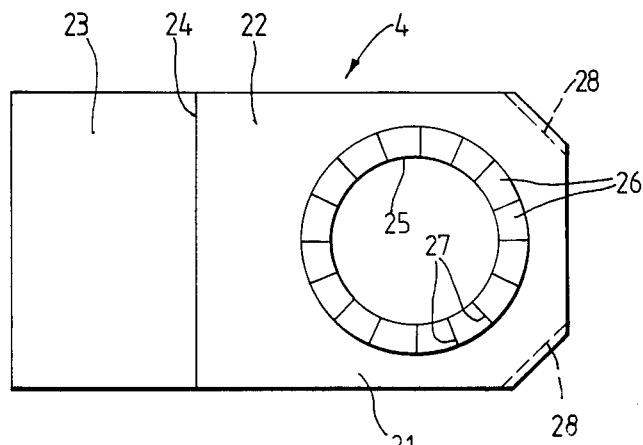
FIG. 4a is a plan view of another of the embodiments of the locking or securing device according to the invention shown in FIG. 1.
Figure 4B:
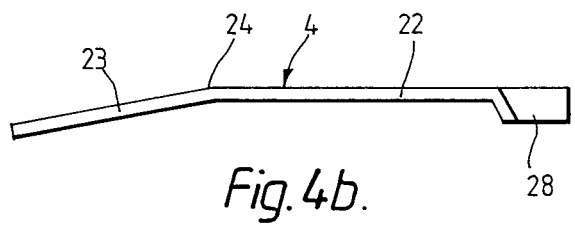

FIGS. 4a and 4b show a plan view and a side view, respectively, of the locking or securing device 4. The locking or securing device 4 comprises a washer 21 made from sheet metal material and comprising a locking or securing element 22 and an element 23 formed in one piece therewith which by means of a bent connection portion 24 is connected with the locking or securing element 22. An opening 25 is formed in the locking or securing element 22. Like the openings 12 and 13 in the embodiment according to FIGS. 2 and 3, the opening 25 is restricted by teeth 26 formed by slots 27 in the sheet metal material. The corners of the locking or securing element 22 are cut and bent downwards for constituting projections 28 of the same kind as the projections in the embodiment according to FIGS. 2 and 3. The locking or securing device 4 is applied to a nut by being pressed onto the nut while the teeth 26 are deformed to a position in which the teeth 26 firmly engage the side surfaces 7 of the nut and the projections 28 engage the side surface of the wheel. Thereby, the element 23 engages the side of the wheel and is acting for canting the locking or securing element 22 in relation to a plane which is perpendicular to the side surfaces 7 of the nut. As is the case in the embodiment of the locking or securing element described with reference to FIGS. 2 and 3, this canting provides an effective retaining and securing of the locking or securing device on the nut and an effective locking thereof. The locking device itself is secured against rotation by contact with adjacent structure, as shown in FIG. 1.

Figure 5A:
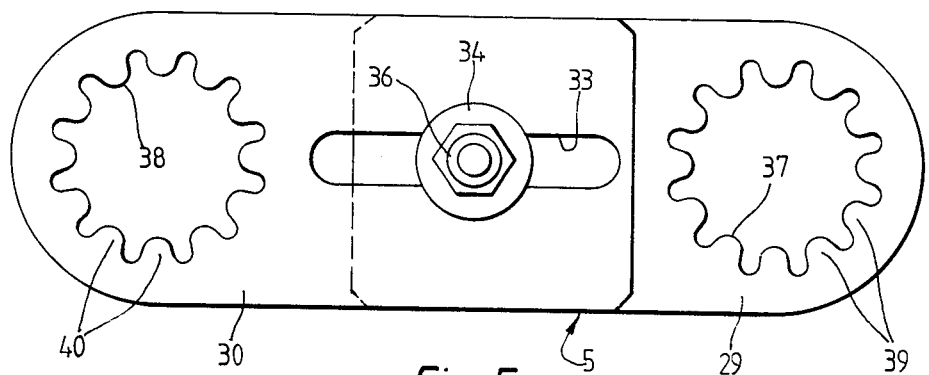
FIG. 5a is a plan view of a further one of the embodiments of the locking or securing device according to the invention shown in FIG. 1.
Figure 5B:
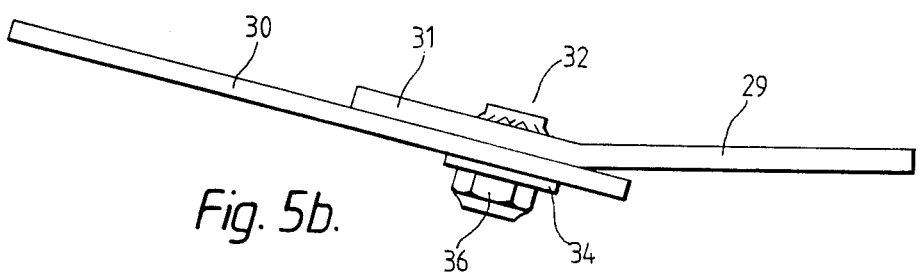
Figure 5C:
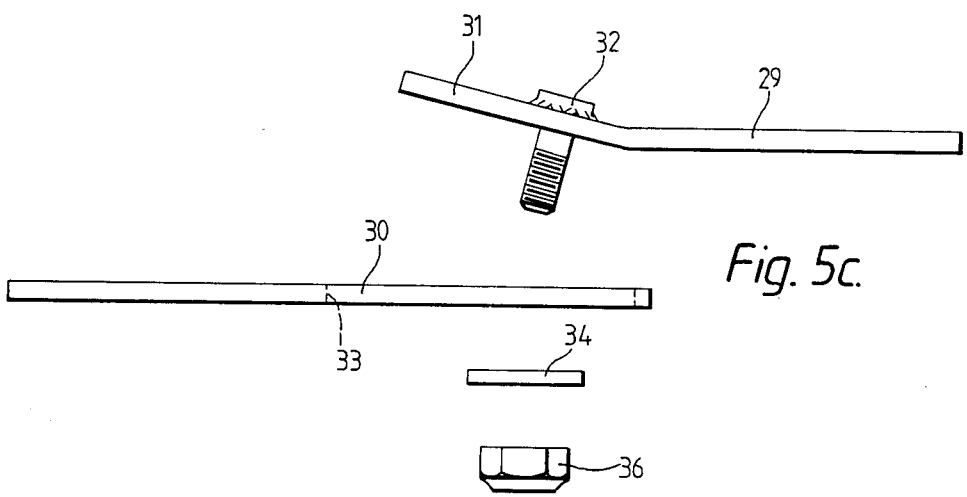
FIG. 5c is a side view corresponding to FIG. 5b in which the parts of the locking or securing device are separated from each other.

The embodiment of the locking or securing device according to the invention shown in FIGS. 5a, 5b and 5c comprises two locking or securing elements 29 and 30, the element 29 having an angularly deflected portion 31 while the element 30 is straight. The elements 29 and 30 are connectable with each other by means of a bolt 32 welded to the portion 31 of the element 29 and extending through a slot 33 in the element 30. The bolt 32 is provided with a washer 34 and a nut 36. The elements 29 and 30 are formed with openings 37 and 38, respectively, enclosed by teeth 39 and 40, respectively.

The locking or securing device 5 is applied to two adjacent wheel nuts by being pressed onto the nuts so that the nuts are received in one of the openings 37 and 38 each. Thereby, the connection between the elements 29 and 30 by means of the bolt 32, the washer 34 and the nut 36 is untightened in such a way that the two elements 29 and 30 can be pressed onto the wheel nuts in a position substantially perpendicular against the planes through the side surfaces of the nuts. Thereupon the nut 36 is tightened, the elements 29 and 30 thereby being canted in relation to said plane so that there is provided a firm and secure engagement between the teeth 39 and 40 on one side and the side surfaces 7 of the wheel nuts 2 on the other side.

Figure 6A:
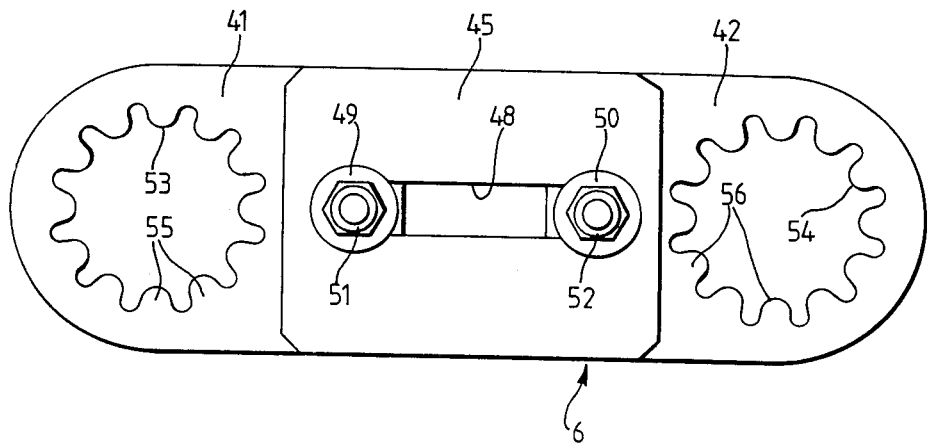
FIG. 6a is a plan view of a further one of the embodiments of a locking or securing device according to the invention shown in FIG. 1.
Figure 6B:
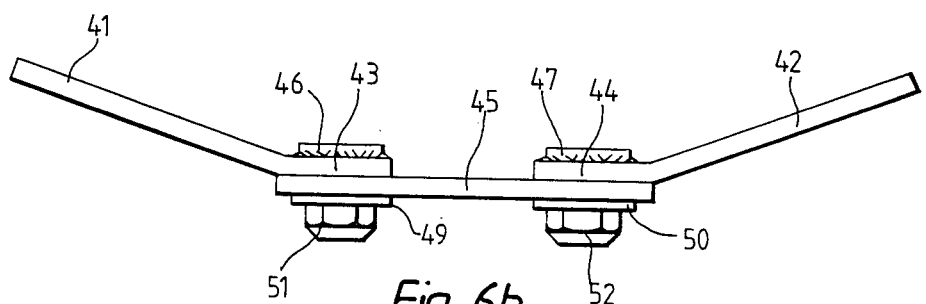
Figure 6C:
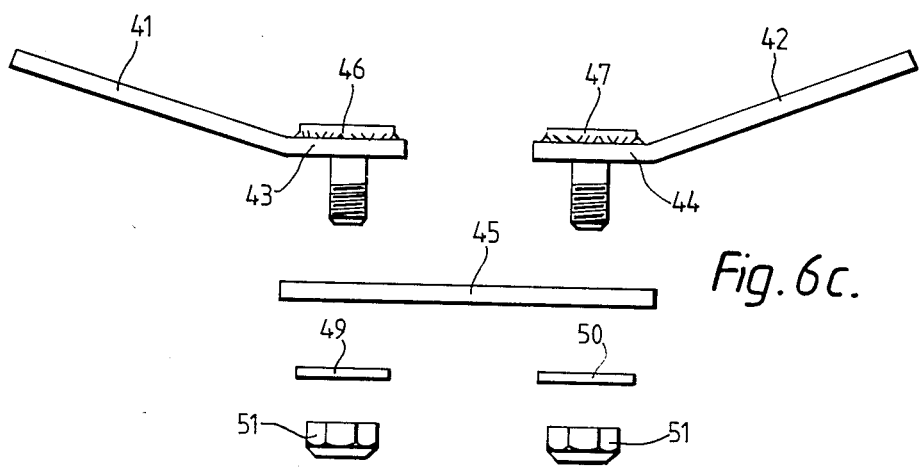
FIG. 6c is a side view corresponding to FIG. 6b in which the parts of the locking or securing device are separated from each other.

The embodiment of the locking or securing device according to the invention shown in FIGS. 6a, 6b and 6c comprises two locking or securing elements 41 and 42 having angularly deflected portions 43 and 44, respectively, and a connection element 45. The connection element 45 connects the elements 41 and 42 by means of bolts 46 and 47 which are welded to the portions 43 and 44, respectively, and extend through a slot 48 formed in the element 45. The bolts are provided with washers 49 and 50, respectively, and nuts 51 and 52, respectively, for fastening the elements 41 and 42 to the connection element 45. The elements 41 and 42 are formed with openings 53 and 54, respectively, for receiving one wheel nut 2 each. The openings 53 and 54 are enclosed by teeth 55 and 56, respectively, adapted firmly to engage the side surfaces 7 of the wheel nuts 2. When the locking or securing device is applied to two adjacent wheel nuts the nuts 51 and 52 are in untightened positions in such a way that the elements 41 and 42 can be applied to the wheel nuts 2 in a position, in which the elements 41 and 42 are substantially perpendicular to a plane through the side surfaces 7 of the wheel nuts 2. After the elements 41 and 42 have been applied to the wheel nuts 2 the nuts 51 and 52 are tightened whereby the elements 41 and 42 are canted in order to take a position in which they firmly engage the side surfaces 7 of the wheel nuts 2.

In the embodiments of the locking or securing device according to the invention shown in FIGS. 5a–5c and 6a–6c the wheel nuts can be released by untightening the nuts 36 and the nuts 51 and 52, respectively, so that the locking or securing elements can be moved to a position, in which they are substantially perpendicular to the side surfaces of the wheel nuts. In this position the locking or securing devices can be removed from the wheel nuts. In all embodiments shown in the drawings the wheel nuts can be released also by being untightened while the locking or securing devices are still attached to the wheel nuts, the teeth of the locking or securing elements being thereby deformed to such a degree that the locking or securing devices can be removed. Of course, it is also possible to displace the locking or securing elements of the locking or securing devices into a position perpendicular to the side surfaces of the wheel nuts by means of any kind of tool, in which position the retaining forces are reduced so that the locking or securing devices can be removed.

The invention can be modified within the scope of the following claims.

I claim:

1. The combination of a locking device and rotatable machine elements to be locked on a structure, such as wheel nuts on a vehicle wheel, said device comprising:
   a substantially rectangular washer having two interconnected locking elements, each locking element having an opening being defined by a toothed portion and adapted for receiving and engaging the respective machine elements, said toothed portion having inner and outer surfaces,
   spacing means for determining the distance of said washer from the structure, said spacing means comprising four corners of said washer bent to form four projections, and
   a connection portion for interconnecting said locking elements, wherein said connecting portion retains said locking elements in a position forming an angle with respect to each other and due to resilient action brings said locking elements in alignment with each other when said washer is positioned for locking the machine elements, wherein said openings are so dimensioned that said toothed portions under deformation engage the respective machine elements, when said washer is positioned for locking the machine elements with a substantial portion of the inner surface of said toothed portions being in contact with the machine elements.

2. The combination of a locking device and a rotatable machine element to be locked on a structure, the rotatable machine element having a polygonal head with side surfaces, wherein said locking device comprises:
   at least one washer having an opening too small to pass over said head without mechanical interference with said surfaces;
   deformable means integral with said washer surrounding said opening for enlarging said opening and resiliently engaging said side surfaces of said head when said washer is forced over said head while said washer is substantially perpendicular to said side surfaces;
   means attached to said at least one washer and effective after said deformable means has engaged said side surfaces for canting said at least one washer relative to said side surfaces while maintaining resilient engagement between said deformable means and said side surfaces, said deformable means being substantially in contact with said side surfaces of said head along the entire circumference of said opening;
   means for securing said locking device against rotation; and
   spacing means for determining the distance of said washer from the structure;
   wherein said washer has a portion including said opening and said means for canting comprises a resilient extension of said washer at an angle to said portion, said resilient extension being adapted to be deformed by engaging a surface underlying said locking device when said washer is forced over said head and then force said portion to assume a position in substantial alignment with said extension while said deformable means are canted relative to said side surfaces.

3. The combination of a locking device and rotatable machine element according to claim 2, wherein said washer and said resilient extension are formed in one piece.

4. The combination of a locking device and rotatable machine elements to be locked on a structure said rotatable machine elements having polygonal heads with side surfaces, wherein said locking device comprises:
   two washers each having an opening too small to pass over said head without mechanical interference with said surfaces;
   deformable means having engaging surfaces, said deformable means being integral with said washer surrounding said opening for engaging said opening and resiliently engaging said side surfaces when said washer is forced over said head while said washer is substantiallly perpendicular to said side surfaces;
   means attached to said washer and effective after said deformable means has engaged said side surfaces for containing said washers relative to said side surfaces while maintaining resilient engagement between said deformable means and said side surfaces, said engaging surfaces of said deformable means being substantially in contact with said side surfaces of said polygonal head;
   means for securing said locking device against rotation; and
   spacing means for determining the distance of said washers from the structure;
   wherein each washer comprises a portion including said opening; and said means for canting comprises a bent, resilient connection portion joining said two portions, said bent resilient connection portion being deformed when said washers are forced over a pair of heads to a position in which said two portions are in substantial alignment with each other while canted relative to said side surfaces.

* * * * *